United States Patent
Kataoka et al.

(10) Patent No.: US 8,701,274 B2
(45) Date of Patent: Apr. 22, 2014

(54) METHOD FOR MANUFACTURING A MAGNETIC HEAD

(75) Inventors: Koji Kataoka, Odawara (JP); Takashi Wagatsuma, Odawara (JP)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 13/341,773

(22) Filed: Dec. 30, 2011

(65) Prior Publication Data
US 2013/0171475 A1 Jul. 4, 2013

(51) Int. Cl.
*G11B 5/127* (2006.01)
*H04R 31/00* (2006.01)

(52) U.S. Cl.
USPC ............ 29/603.14; 29/603.12; 29/603.13; 29/603.16; 29/603.18; 360/121; 360/122; 360/317; 360/324.2; 360/324.12

(58) Field of Classification Search
USPC ............ 29/603.07, 603.08, 603.11–603.16, 29/603.18; 360/121, 122, 126, 317, 324.2, 360/324.12
See application file for complete search history.

(56) References Cited

U.S. PATENT DOCUMENTS

| | | | |
|---|---|---|---|
| 4,843,506 A | 6/1989 | Gill et al. | |
| 5,434,826 A * | 7/1995 | Ravipati et al. | 367/140 |
| 6,005,753 A | 12/1999 | Fontana, Jr. et al. | |
| 6,222,702 B1 | 4/2001 | Macken et al. | |
| 6,710,982 B2 | 3/2004 | Mack et al. | |
| 7,236,330 B2 | 6/2007 | Suk | |
| 7,530,158 B2 * | 5/2009 | Araki et al. | 29/603.07 |
| 7,573,675 B2 | 8/2009 | Ohta et al. | |
| 2006/0209469 A1 | 9/2006 | Akimoto | |
| 2008/0043377 A1 | 2/2008 | Yoshiike et al. | |
| 2009/0086380 A1 | 4/2009 | Seagle | |
| 2009/0290265 A1 | 11/2009 | Kane | |
| 2012/0320473 A1 * | 12/2012 | Okamura et al. | 360/294 |

FOREIGN PATENT DOCUMENTS

| | | |
|---|---|---|
| JP | 2008176857 | 7/2008 |
| JP | 2009093705 | 4/2009 |

OTHER PUBLICATIONS

M. Hashimoto and A. Furukawa, "Sudden Permeability Changes in the Shields of Shielded GMR Heads," Journal of the Magnetics Society of Japan, vol. 26 (2002), No. 4, pp. 307-316.

* cited by examiner

*Primary Examiner* — Paul D Kim
(74) *Attorney, Agent, or Firm* — Billion & Armitage

(57) ABSTRACT

A manner for stabilizing the shield domain structure is described that employs the magnetic field of a hard bias layer. More particularly, it has been found that the shield domain structure is stabilized when the height of the hard bias layer in the depth direction is made substantially half the height of upper shield layer. In another embodiment of the invention, a stabilizing structure is provided at approximately the midpoint of the shield in order to fix the closure domain of the shield to the desired two-domain structure. In an embodiment of the invention, the stabilizing structure is made convex or concave as viewed from the air-bearing surface.

6 Claims, 12 Drawing Sheets

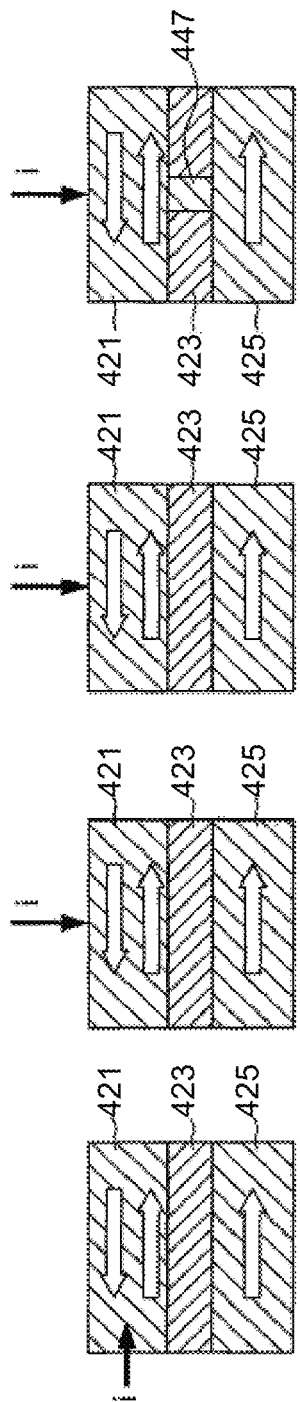

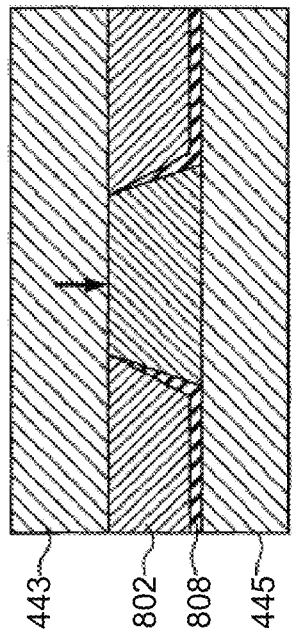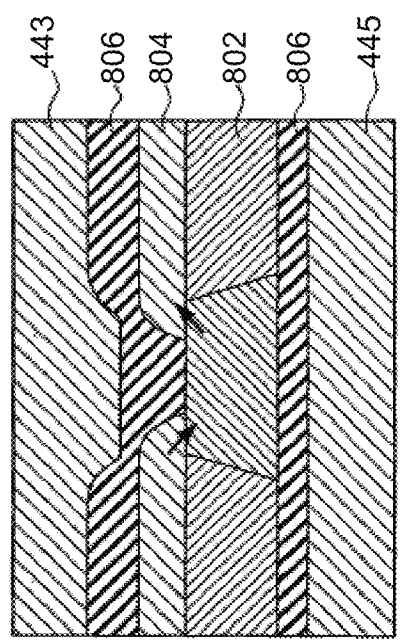

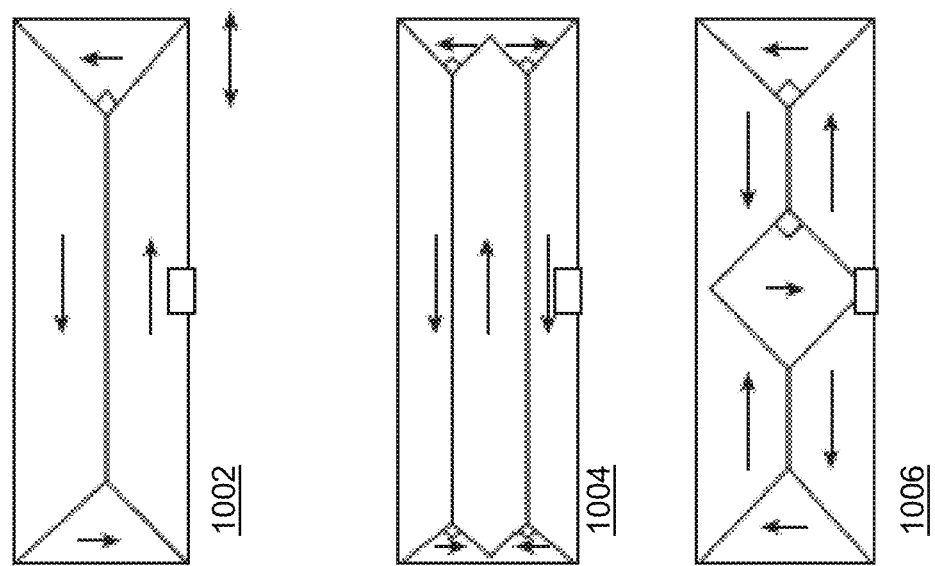
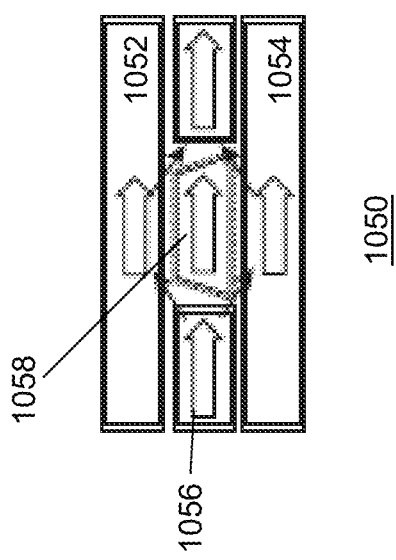
Fig. 10

METHOD FOR MANUFACTURING A MAGNETIC HEAD

FIELD OF THE INVENTION

The present invention generally relates to the field of computer hard disks. More particularly, the present invention relates to a magnetoresistive magnetic head and to a method for stabilizing the magnetic characteristics of a magnetoresistive element.

BACKGROUND OF THE INVENTION

A read/write head in a disc drive typically includes a magnetoresistive (MR) read transducer that is deposited between non-magnetic layers and magnetic shield layers. The magnetoresistive read transducer typically includes a magnetoresistor, electrical contacts and one or more bias magnets that magnetically bias the magnetoresistor. Various magnetic biasing arrangements in the magnetoresistive sensor can be used to improve uniformity, predictability, linearity, and/or reduce noise.

Domains formed in the nearby magnetic shield layers can also magnetically bias the magnetoresistor. Control of both domain magnetization direction and domain wall location in the shields are important for the proper operation of the magnetoresistive transducer because of magnetic interaction between the magnetoresistor and the shield.

Some shield designs control the location of domain walls by control of the shield shape. Other shield designs control the polarity of magnetic domains by removing all domain walls and forcing the shield into a single domain state. A side effect of these single domain state designs is that, without closure domains, magnetic charge forms at the edge of the shield that can cause track erasure and loss of data.

Hard-disk technology is constantly evolving. In hard drive technology, the sensor that detects magnetic information on a rotating disk has played an important role. Today's sensors are drastically different from those used even a few years ago. For example, modern sensors can detect and transmit information from recorded data at densities greater than 200 Gbit/$in^2$ and data rates approaching 1 GHz. Advances in nanomagnetics, magnetic ultrathin films, magneto-electronics, as well as device processing, have advanced this technology. It can be expected that the future will continue to bring advances in sensor technology.

The read sensor in the recording head of hard-disk drives (HDD), based on the phenomenon of giant magnetoresistance (GMR), is an example of the commercialization of magnetic nanotechnology and spintronics. The basic magnetoresistive film can be composed of a dozen or more layers of magnetic and non-magnetic materials whose effective thickness is controlled down to sub-Angstrom level. Each of these layers directly determines or affect the magnetic and magnetotransport behavior.

From this multilayer, a working sensor and head are created after, for example, over 250 processing steps, using techniques that are near the limits of current lithography, combining insulating and conducting materials, hard magnet biasing, and magnetic shielding. The sensor is designed to fly just a few nanometers above a spinning disk at up to 15000 revolutions per minute.

The recording head has three main components: (1) the read sensor ("reader"); (2) the write transducer ("writer"), which is a microfabricated planar electromagnet with a narrow pole that creates a high density of magnetic flux in proximity to the media; and (3) the slider, which is a shaped piece of substrate (typically alumina-titanium carbide) onto which the writer and read sensor are built, and is engineered to "fly" only a few nanometers above the spinning media disk.

For any sensor, there is an appropriate combination of writer and slider which forms a coherent recording head device and, together with the chosen media, mechanical characteristics, and electronics, forms a complete recording system. The recording environment in which the head is expected to operate is first introduced, including media characteristics, magnetic interference and shielding, and signal-to-noise (SNR) considerations. These constraints put specific boundaries on the sizes, geometries, and magnetic properties which a read sensor must achieve.

The magnetic recording process utilizes a thin film transducer for the creation or writing of magnetized regions (bits) onto a thin film disk and for the detection or reading of the presence of transitions between the written bits. The thin film transducer is referred to as a thin film head. It consists of a read element, which detects the magnetic bits, and a write element, which creates or erases the bits.

FIG. 1 is a schematic of the recording process. Shown in FIG. 1 is read sensor 102, write element 104, and recording medium 106. The perpendicular write element 104 writes magnetic transitions vertically within recording medium 106 by orienting the write field perpendicular to the direction of the recording film surface. The magnetic field created by this perpendicular head returns to this element through a magnetically soft underlayer 110 within the medium, or return path. In this way the recording medium 106 lies within the write gap. The resulting perpendicular write fields can be up to two times larger than longitudinal write fields, thus enabling the perpendicular write element to write information on high coercivity media that is inherently more thermally stable. In perpendicular recording, the bits do not directly oppose each other resulting in a significantly reduced transition packing. This allows bits to be more closely packed with sharper transition signals, facilitating easier bit detection and error correction. During a read operation, read sensor 102 detects perpendicular bits 108 on recording medium 106.

In a disk recording system, successive bits are written onto the disk surface in concentric rings or tracks separated by a guard band. The head transducer is attached to a suspension, and the suspension is attached to an actuator which controls the position of the transducer in a plane above the disk surface. A specially-designed topography on the lower surface of the slider (known as the air-bearing surface or ABS) allows the head to "fly" above the rotating disk (typically 4200-15000 rpm), and controls the height of the transducer above the disk surface, typically 10 to 15 nm.

Referring now to FIG. 2, there is shown an implementation of a disk drive 200. As shown in FIG. 2, at least one rotatable magnetic disk 212 is supported on a spindle 214 and rotated by a disk drive motor 218. The magnetic recording on each disk is in the form of annular patterns of concentric data tracks on the magnetic disk 212.

At least one slider 213 is positioned near the magnetic disk 212, each slider 213 supporting one or more magnetic head assemblies 221. As the magnetic disk rotates, slider 213 moves radially in and out over the disk surface 222 so that the magnetic head assembly 221 may access different tracks of the magnetic disk where desired data are written. Each slider 213 is attached to an actuator arm 219 by way of a suspension 215.

Suspension 215 provides a spring force which biases slider 213 against disk surface 222. Each actuator arm 219 is attached to actuator 227. Actuator 227 as shown in FIG. 2 may be a voice coil motor (VCM). The VCM comprises a coil movable within a fixed magnetic field, the direction and speed of the coil movements being controlled by the motor current signals supplied by controller 229.

During operation of the disk storage system, the rotation of magnetic disk 212 generates an air bearing between slider 213 and the disk surface 222 which exerts an upward force or lift on the slider. The air bearing thus counter-balances the spring force of suspension 215 and supports slider 213 off and slightly above the disk surface by a small, substantially constant spacing during normal operation.

The various components of the disk storage system are controlled in operation by control signals generated by control unit 229. Control signals may also include internal clock signals. Typically, control unit 229 comprises logic control circuits, digital storage and a microprocessor. Control unit 229 generates control signals to control various system operations such as drive motor control signals on line 223 and head position and seek control signals on line 228. The control signals on line 228 provide the desired current profiles to optimally move and position slider 213 to the desired data track on disk 212. Write and read signals are communicated to and from write and read heads 221 by way of recording channel 225.

With reference to FIG. 3, the orientation of magnetic head 221 in slider 213 can be seen in more detail. FIG. 3 is an ABS view of slider 213, and as can be seen, the magnetic head, including an inductive write head and a read sensor, is located at a trailing edge of the slider. The above description of a typical magnetic disk storage system, and the accompanying illustrations of FIG. 1-3 are for representation purposes only. It should be apparent that disk storage systems may contain a large number of disks and actuators, and each actuator may support a number of sliders.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode, the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn or IrMn. While an antiferromagnetic (AFM) material such as PtMn or IrMn does not in and of itself have a magnetization, when exchange coupled with a magnetic material, it can strongly pin the magnetization of the ferromagnetic layer.

In order to meet the ever increasing demand for improved data rate and data capacity, research has focused on the development of perpendicular recording systems. A traditional longitudinal recording system stores data as magnetic bits oriented longitudinally along a track in the plane of the surface of the magnetic disk. This longitudinal data bit is recorded by a fringing field that forms between a pair of magnetic poles separated by a write gap.

A perpendicular recording system, on the other hand, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole.

The advent of perpendicular recording systems has lead to an increased interest in Current perpendicular to plane (CPP) sensors, which are particularly suited to use in perpendicular recording systems, due to their ability to meet higher linear density requirements. A CPP sensor differs from a more conventional current in plane (CIP) sensor such as that discussed above in that the sense current flows through the CPP sensor from top to bottom in a direction perpendicular to the plane of the layers making up the sensor. Whereas the more traditional CIP sensor has insulation layers separating it from the shields, the CPP sensor contacts the shields at its top and bottom surfaces, thereby using the shields as leads.

One type of CPP sensor is a tunnel valve or tunnel magnetoresitive (TMR) sensor. Such sensors have a magnetic free layer and a magnetic pinned layer similar to a GMR or spin valve. The tunnel valve, however, has a thin electrically insulating barrier layer sandwiched between the free and pinned layers rather than an electrically conductive spacer layer.

The above description of a typical magnetic disk storage system, and the accompanying illustrations of FIG. 1-3 are for representation purposes only. It should be apparent that disk storage systems may contain a large number of disks and actuators, and each actuator may support a number of sliders.

A magnetic read/write transducer and a method of making such a magnetic read/write transducer are needed in which magnetic biasing is provided to a shield that reduces track erasures, that provides a low noise, high linearity output, and that is easily manufactured.

SUMMARY OF THE INVENTION

In an embodiment of the invention, a manner for stabilizing the shield domain structure is described that employs the magnetic field of a hard bias layer. More particularly, it has been found that the shield domain structure is stabilized when the height of the hard bias layer in the depth direction is made substantially half the height of upper shield layer. It was found that a range which is closer to ½ the height of the shield performed better than ⅓ of the height of the shield, for example.

In another embodiment of the invention, a stabilizing structure is provided at approximately the midpoint of the shield in order to fix the closure domain of the shield to the desired two-domain structure. In an embodiment of the invention, the stabilizing structure is made convex as viewed from the air-bearing surface. In another embodiment, the stabilizing structure is made concave as viewed from the air-bearing surface. In yet another embodiment of the invention, stabilizing structure is made substantially parallel to the air bearing surface. The stabilizing structure serves to stabilize the shield and fix the closure domain of the shield to a two-domain structure.

BRIEF DESCRIPTION OF THE DRAWINGS

The following drawings will be used to more fully describe embodiments of the present invention.

FIGS. 7(a)-(d) illustrate four general types of spin valves.

FIGS. 8(a)-(b) illustrate the structural difference between the CIP and CPP GMR spin valves.

FIG. 10 includes various schematics for various MFM images used in the analysis of the present invention.

DETAILED DESCRIPTION OF THE INVENTION

As the recording density in hard disk devices (HDDs) increases, there is a need for greater sensitivity in magnetoresistive magnetic heads used as reproduction heads. Spin valve-type magnetoresistive heads for which high output is expected have come into general use in recent years.

Figure 1:
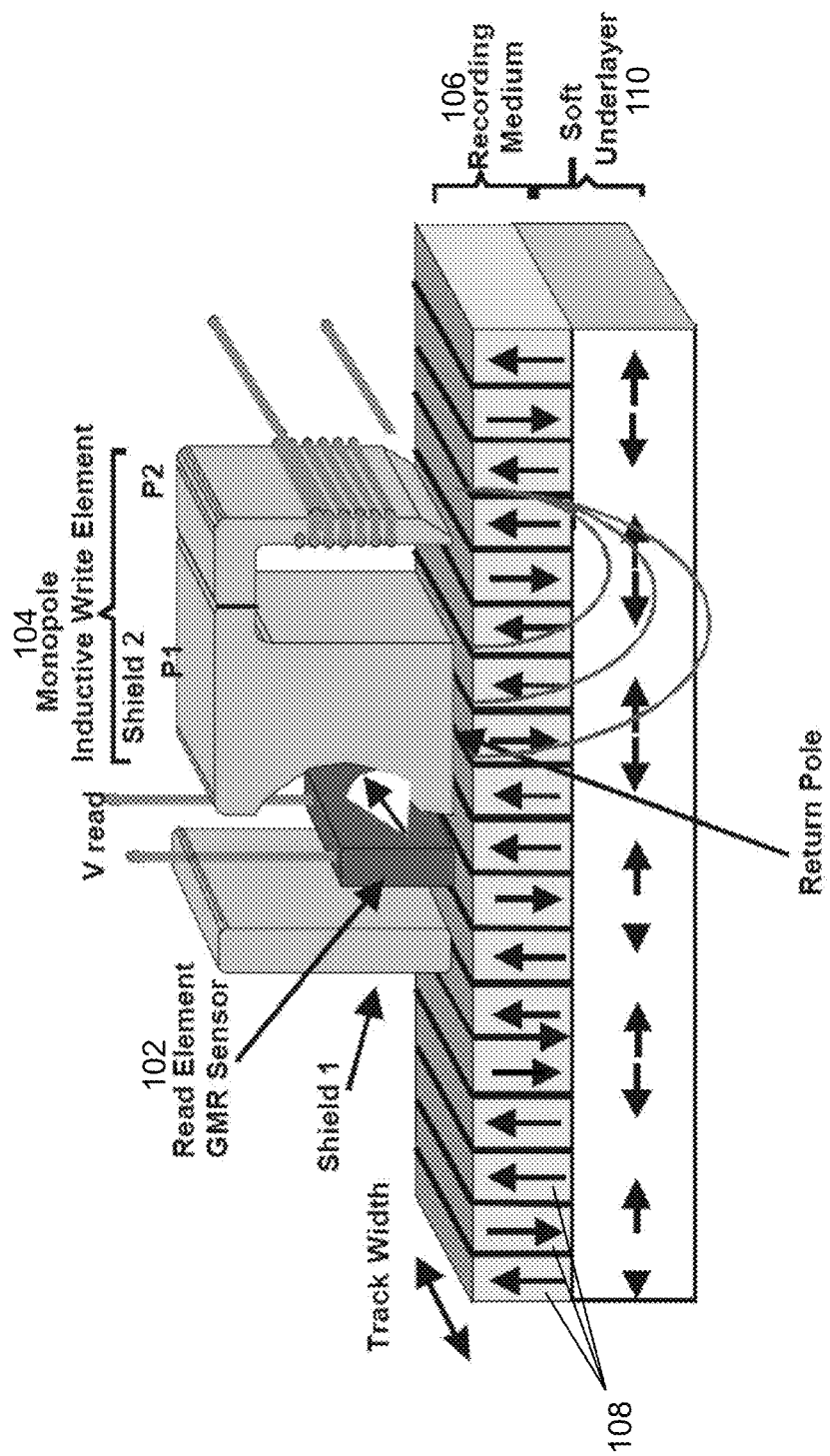
FIG. 1 is schematic illustration of a disk drive reader and sensor.
Figure 2:
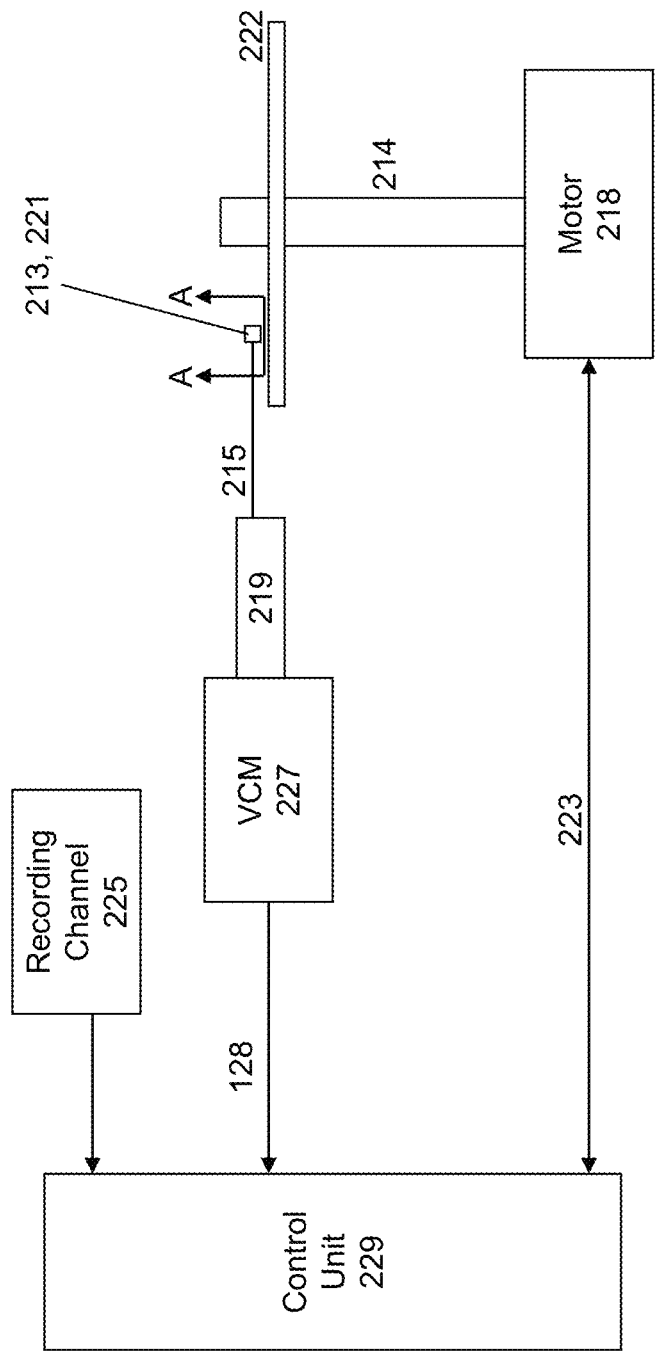
FIG. 2 is a schematic illustration of a disk drive system in which the invention might be embodied.
Figure 3:
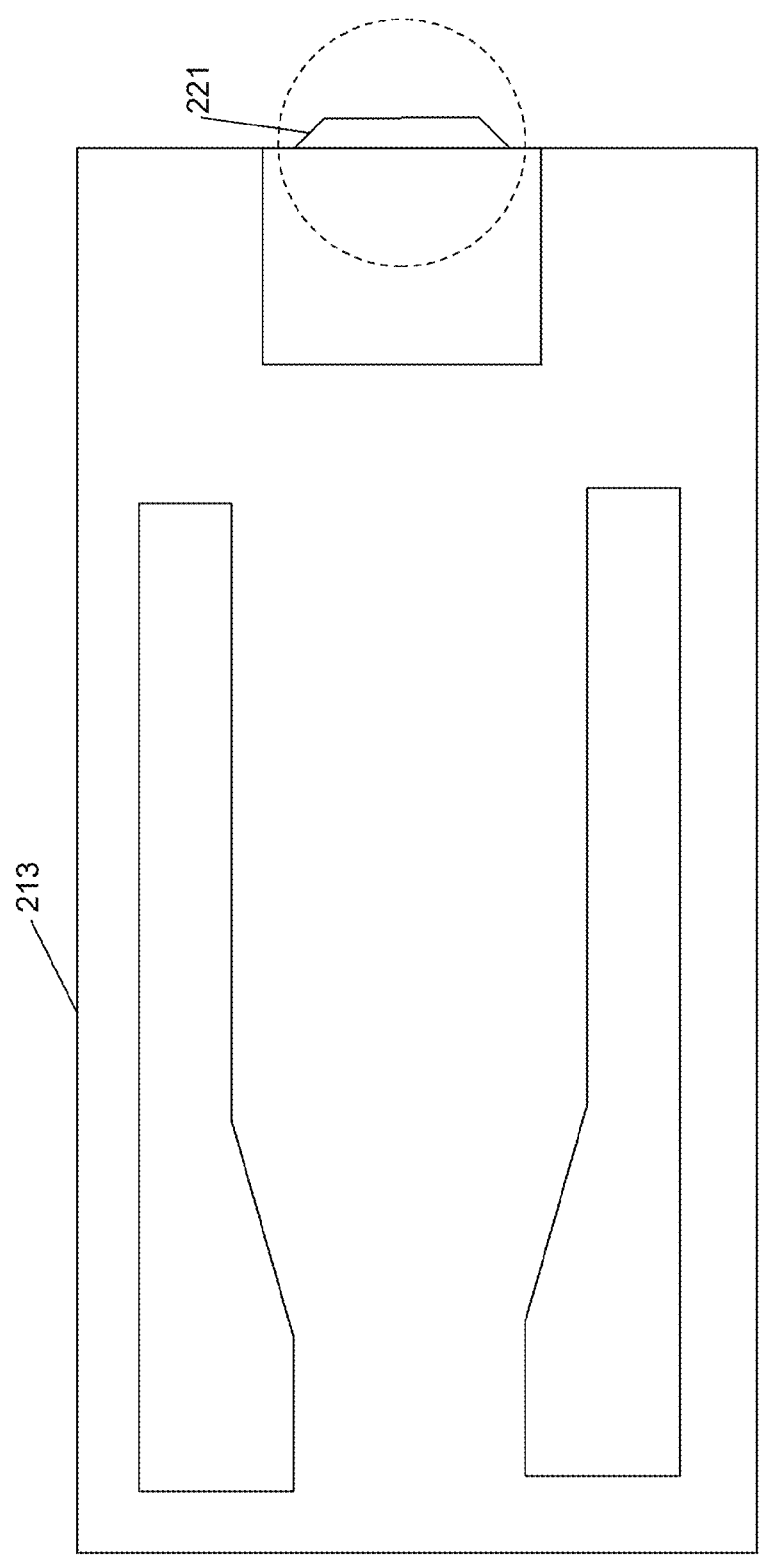
FIG. 3 is an ABS view of a slider illustrating the location of a magnetic head thereon.
Figure 4:
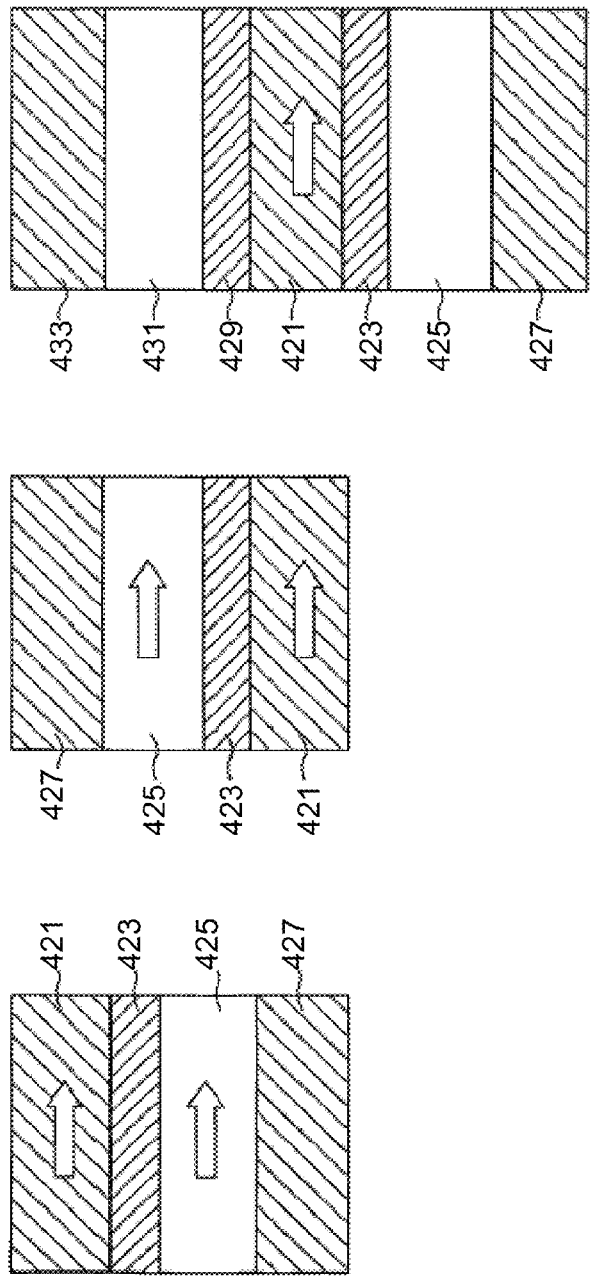
FIGS. 4(a)-(c) illustrate various read elements used in a magnetic recording scheme known as "spin valves."

FIGS. 4(a)-(c) illustrate various read elements used in a magnetic recording scheme known as "spin valves." In the bottom type spin valve illustrated in FIG. 4(a), a free layer 421 operates as a sensor to read the recorded data from the recording medium. A spacer 423 is positioned between the free layer 421 and a pinned layer 425. On the other side of the pinned layer 425, there is an anti-ferromagnetic (AFM) layer 427.

In the top type spin valve illustrated in FIG. 4(b), the position of the layers is reversed. The operation of the spin valves illustrated in FIGS. 4(a)-(b) is substantially similar, and is described in greater detail below.

The direction of magnetization in the pinned layer 425 is fixed, whereas the direction of magnetization in the free layer 421 can be changed, for example (but not by way of limitation) depending on the effect of an external field, such as the recording medium.

When the external field (flux) is applied to a reader, the magnetization of the free layer 421 is altered, or rotated, by an angle. When the flux is positive the magnetization of the free layer is rotated upward, and when the flux is negative the magnetization of the free layer is rotated downward. Further, if the applied external field changes the free layer 421 magnetization direction to be aligned in the same way as pinned layer 425, then the resistance between the layers is low, and electrons can more easily migrate between those layers 421, 425.

However, when the free layer 421 has a magnetization direction opposite to that of the pinned layer 425, the resistance between the layers is high. This high resistance occurs because it is more difficult for electrons to migrate between the layers 421, 425.

Similar to the external field, the AFM layer 427 provides an exchange coupling and keeps the magnetization of pinned layer 425 fixed. The properties of the AFM layer 427 are due to the nature of the materials therein. The AFM layer 427 is usually PtMn or IrMn.

The resistance change between when the layers 421, 425 are parallel and anti-parallel ΔR should be high to have a highly sensitive reader. As head size decreases, the sensitivity of the reader becomes increasingly important, especially when the magnitude of the media flux is decreased.

FIG. 4(c) illustrates a dual type spin valve. Layers 421 through 425 are substantially the same as described above with respect to FIGS. 4(a)-(b). However, an additional spacer 429 is provided on the other side of the free layer 421, upon which a second pinned layer 431 and a second AFM layer 433 are positioned. The dual type spin valve operates according to the same principle as described above with respect to FIGS. 4(a)-(b). However, an extra signal provided by the second pinned layer 431 increases the resistance change ΔR.

Figure 5:
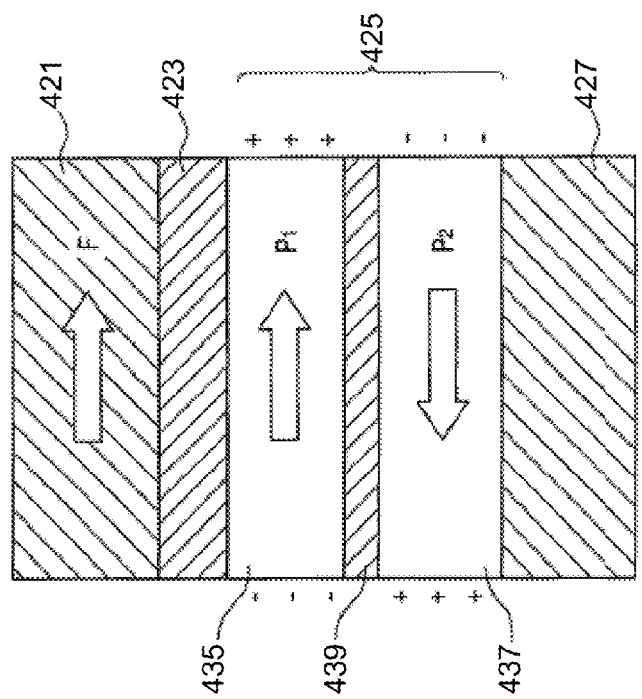
FIG. 5 illustrates a synthetic spin valve.

FIG. 5 illustrates a synthetic spin valve. The free layer 421, the spacer 423 and the AFM layer 427 are substantially the same as described above. In FIG. 5 only one state of the free layer is illustrated. However, the pinned layer further includes a first sublayer 435 separated from a second sublayer 437 by a spacer 439.

In the synthetic spin valve, the first sublayer 435 operates according to the above-described principle with respect to the pinned layer 425. Additionally, the second sublayer 437 has an opposite spin state with respect to the first sublayer 435. As a result, the pinned layer total moment is reduced due to anti-ferromagnetic coupling between the first sublayer 435 and the second sublayer 437. A synthetic spin valve head has a pinned layer with a total magnetic flux close to zero and thus greater stability and high pinning field can be achieved than with the single layer pinned layer structure.

Figure 6:
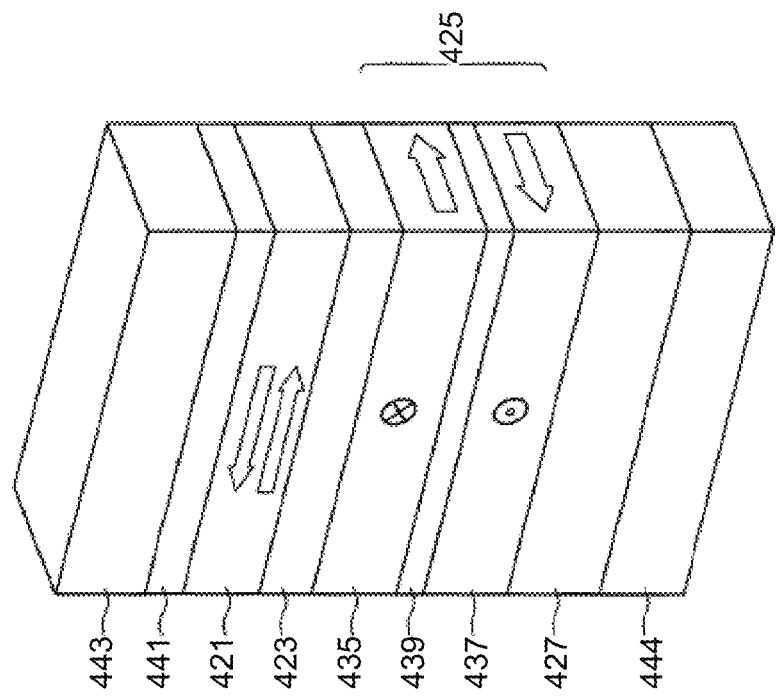
FIG. 6 illustrates the synthetic spin valve with a shielding structure.

FIG. 6 illustrates the synthetic spin valve with a shielding structure. As noted above, it is important to avoid unintended magnetic flux from adjacent bits from being sensed during the reading of a given bit. A protective layer 441 is provided on an upper surface of the free layer 421 to protect the spin valve against oxidation before deposition of top shield 443, by electroplating in separated system. Similarly, a bottom shield 445 is provided on a lower surface of the AFM layer 427. A buffer layer, not shown in FIG. 6, is usually deposited before AFM layer 427 for a good spin-valve growth.

As shown in FIGS. 7(a)-(d), there are generally four types of spin valves. The type of spin valve structurally varies based on the structure of the spacer 423.

The spin valve illustrated in FIG. 7(a) uses the spacer 423 as a conductor, and is used for a CIP scheme for a giant magnetoresistance (GMR) type spin valve. The direction of sensing current magnetization, as represented by "i", is in the plane of the GMR element.

In the GMR spin valve, resistance is minimized when the magnetization directions (or spin states) of the free layer 421 and the pinned layer 425 are parallel and is maximized when the magnetization directions are opposite. As noted above, the free layer 421 has a magnetization of which the direction can be changed. Thus, the GMR system avoids perturbation of the head output signal by minimizing the undesired switching of the pinned layer magnetization.

GMR depends on the degree of spin polarization (represented as $\beta$) of the pinned and free layers, and the angle between their magnetic moments. Spin polarization of each layer depends on the difference between the number of electrons having spin states up and down.

Resistivity (represented as $\rho$) is a measure of the contribution of the nature of a material to resistance, which is represented as $R=\rho L/A$, where R is the material resistance, L the length and A the cross sectional area. For the spin valve, this intrinsic resistivity can be divided by $(1-\beta^2)$ to obtain the Normalized resistivity $\rho^*$. The normalized resistivity $\rho^*$ is proportional to $\Delta R$, so that a large $\beta$ corresponds to a larger $\Delta R$.

In the spin valves, the free layer and the pinned layer are formed of CoFe, by deposition in an argon gas environment. Due to the nature of this material, the value of $\rho$ that is produced does not generate a sufficiently large $\Delta R$ to produce spin valves of sufficient quality as the above-described size changes occur in spin valves, such as decreased size. For example, but not by way of limitation, due to the nature of CoFe as deposited in the spin valve, the pinned and/or free layer cannot be made sufficiently thin to reduce the overall thickness of the spin valve as needed to accommodate advances in the art.

The GMR scheme will now be discussed in greater detail. As the free layer 421 receives the flux that signifies bit transition, the free layer magnetization rotates by a small angle in one direction or the other, depending on the direction of flux. The change in resistance between the pinned layer 425 and the free layer 421 is proportional to angle between the moments of the free layer 421 and the pinned layer 425. There is a relationship between resistance change and efficiency of the reader.

The GMR spin valve has various requirements. For example, but not by way of limitation, a large resistance change $\Delta R$ is required to generate a high output signal. Further, low coercivity is desired, so that small media fields can also be detected. With high pinning field strength, the AFM structure is well defined. When the interlayer coupling is low the sensing layer is not adversely affected by the pinned layer. Further, low magnetistriction is desired to minimize stress on the free layer.

CPP-GMR head are used where the sensing current flows perpendicularly to the spin valve plane. As a result, size can be reduced and thermal stability can be increased. Various spin valves that operate in the CPP scheme are illustrated in FIGS. 7(b)-(d).

FIG. 7(b) illustrates a tunneling magnetoresistive (TMR) spin valve for CPP scheme. In the TMR spin valve, the spacer 423 acts as an insulator, or tunnel barrier layer. Thus, the electrons can cross the insulating spacer 423 from free layer to pinned layer or verse versa without losing their spin direction. TMR spin valves have an increased magnetic resistance (MR) on the order of about 30-50%.

FIG. 7(c) illustrates a CPP-GMR spin valve. While the general concept of GMR is similar to that described above with respect to CIP-GMR, the current is transferred perpendicular to the plane, instead of in-plane. As a result, the difference in resistance and the intrinsic MR are substantially higher than the CIP-GMR.

FIG. 7(d) illustrates a ballistic magnetoresistance (BMR) spin valve. In the spacer 423, which operates as an insulator, a ferromagnetic region 447 connects the pinned layer 425 to the free layer 421. The area of contact is on the order of a few nanometers. As a result, there is a substantially high MR, due to electrons scattering at the domain wall created within this nanocontact. Other factors include the spin polarization of the ferromagnets, and the structure of the domain that is in nanocontact with the BMR spin valve.

In the spin valves of FIGS. 7(a)-(d), the spacer 423 of the spin valve is an insulator for TMR, a conductor for GMR, and an insulator having a magnetic nano-sized connector for BMR. While TMR spacers are generally made of more insulating metals such as alumina, GMR spacers are generally made of more conductive metals, such as copper.

FIGS. 8(a)-(b) illustrate the structural difference between the CIP and CPP GMR spin valves. As shown in FIG. 8(a), there is a hard bias 802 on the sides of the GMR spin valve, with an electrode 804 on upper surfaces of the GMR. Gaps 806 are also required. As shown in FIG. 8(b), in the CPP-GMR spin valve, an insulator 808 is deposited at the side of the spin valve that the sensing current can only flow in the film thickness direction. Further, no gap is needed in the CPP-GMR spin valve.

As a result, the current has a much larger surface through which to flow, and the shield also serves as an electrode. Hence, the overheating issue is substantially addressed.

Further, the spin polarization of the layers of the spin valve is intrinsically related to the electronic structure of the material, and a highly resistive material can induce an increase in the resistance change.

Spin valve-type magnetoresistive heads are, therefore, thin-film laminated devices comprising a free layer, a nonmagnetic interlayer, a fixed layer, and an antiferromagnetic layer. The free layer and fixed layers are disposed on either side of the nonmagnetic interlayer. The antiferromagnetic layer contacts the fixed layer on the opposite side to the nonmagnetic interlayer. The free layer comprises one or more ferromagnetic layers.

Spin valve-type magnetoresistive heads have properties wherein resistance changes at a relative angle formed by the magnetization direction of the free layer and the fixed layer. Spin valve-type magnetoresistive heads are inserted between shields made of ferromagnetic material, and magnetic signals on a magnetic disk medium can be reproduced by allowing a prescribed detection current to flow through the shields, and detecting resistance changes due to changes in magnetic field as electrical signals.

In recent years, technology has started to be used in which part of the air bearing surface is made to protrude using a TFC element or the like, in order to reduce the amount of floating for magnetic heads and media. As a result, there is a greater risk of contact between the air bearing surface and the media, and this increases the likelihood of instability in the shield magnetization state.

In an embodiment of the invention, the free layer is designed in such a way that its magnetization direction readily turns when changes in the field of signals recorded on a disk medium are received. The nonmagnetic interlayer is made of a nonmagnetic material such as MgO. The fixed layer consists of a ferromagnetic thin film comprising one or a plurality of layers, and fixes the magnetization direction by electrically coupling to the antiferromagnetic layer in which one surface on the fixed layer side is made of an antiferromagnetic material.

In order to produce higher recording density in HDDs, it is necessary to narrow the spacing between the head and the disk while at the same time the head element promotes refining of the track width and the gap length. In recent years use has been made of TFC (Thermal assist Flying Control) as technology for narrowing the spacing to the nanometer level, and part of the element air bearing surface is deliberately made to project by means of thermal expansion. This increases the risk of contact between the head element and the disk surface and therefore there is a need for stabilizing the magnetic head against mechanical stress.

Figure 9A:
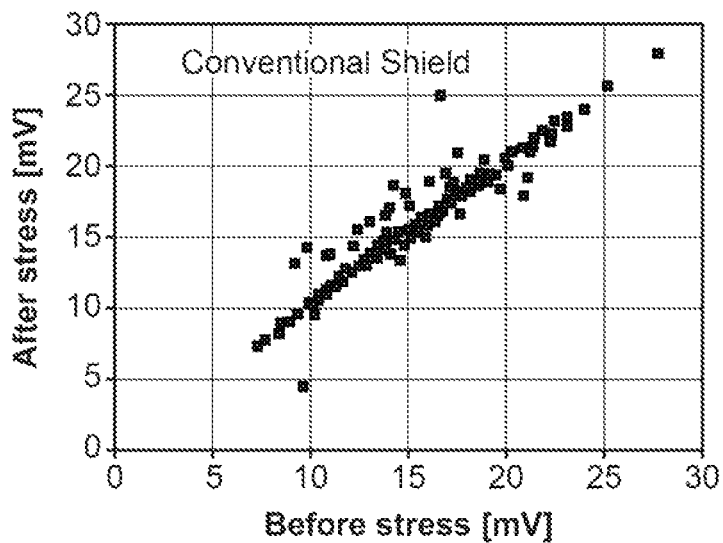
FIGS. 9A and 9B are graphs that illustrating the effect of stress on a magnetic head.
Figure 9B:
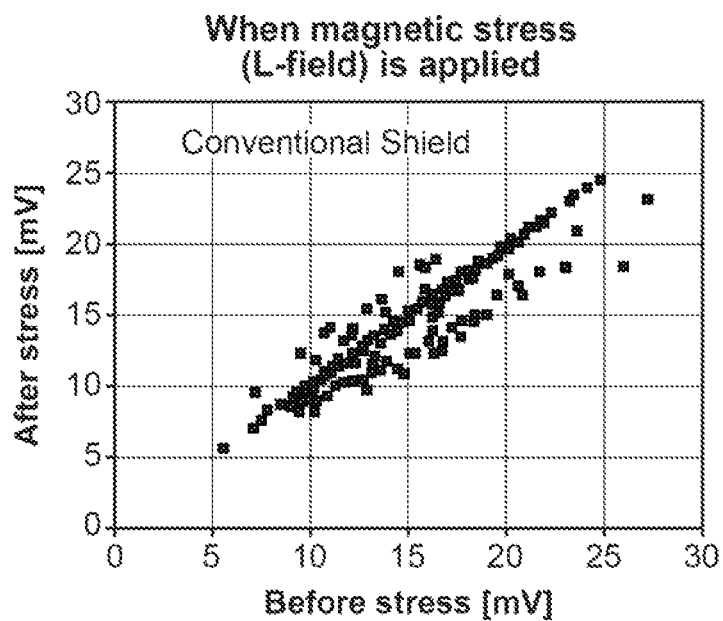

The problem of loss of stability in the reproduction head due to mechanical stress in the magnetic head is, therefore, a source of concern. In order to investigate the issue of stability, experiments were carried out in which ultrasonic stress was applied to the magnetic head. The results confirmed that a change in reproduction output was apparent before and after stress had been applied. Shown in FIGS. 9A and 9b is the change in output before and after the application of stress, and fluctuations in output could be confirmed in several heads. Shown in FIGS. 9A and 9B are a graphs illustrating the effect of stress. Mechanical stress is illustrated in FIG. 9A and magnetic stress (L-field) is illustrated in FIG. 9B. More particularly, on the x-axis is plotted the output voltage before the application of stress an on the y-axis is plotted the output voltage after the application of stress. This phenomenon is believed to be due to changes in the magnetization orientation of the shields. The reproduction head element is present in the vicinity of the air bearing surface, and, therefore, when there is a change in the magnetization orientation of the shield in the vicinity of the air bearing surface, in particular, the effective magnetic field on the reproduction head element changes, so that the reproduction output also changes.

In order to more particularly identify this phenomenon, attention has focused on the magnetization state of the shields, and MFM images of the magnetization state were examined by producing a shield element 1050 (shown in FIG. 10) having the same shape as the head. As shown shield element 1050 includes shield 1052 and 1054. Between shield 1052 and 1054 is hard bias layer 1056 and free layer 1058.

Shown in FIG. 10 are schematics 1002, 1004, and 1006 of various MFM images. As a result of examining a plurality of MFM images, it was confirmed that the shields had the following three characteristic domain structures.
(1) a two-domain structure as shown in structure 1002;
(2) a three-domain structure as shown in structure 1004; and
(3) a longitudinal-split domain structure as shown in structure 1006.

The testing showed that when external stress was applied to these shields, there were times when the domain structure changed to another domain structure. This kind of change in the domain structure was believed to be related to an instability of the magnetic head element lying between the shields. It was, therefore, desired to stabilize the domain structure.

Among these three types of domain structures, the most stable type which had a high existence probability was a two-domain structure 1002, followed by a three-domain structure 1004. For either domain structure, it is believed that the head output is stable when the state thereof can be maintained. In the case of a longitudinal-split domain structure 1006, it is envisaged that even with the structure unchanged, the magnetization direction in the vicinity of the reproduction head element readily inverts because of a small amount of domain wall displacement at the air bearing surface, and so this type is not considered favorable in an embodiment of the invention. Other developments in the industry, however, can make the structure 1006 desirable and may be used in accordance with the teachings of the present invention.

In an embodiment of the invention, a head having high stress resistance is obtained by selectively maintaining the two-domain structure 1002 which is the most stable type. By adopting this type of structure, it is possible to provide a magnetic head which can prevent changes in the shield domain structure to anything other than a two-domain structure, and which maintains the stability of the reproduction output.

Figure 11:
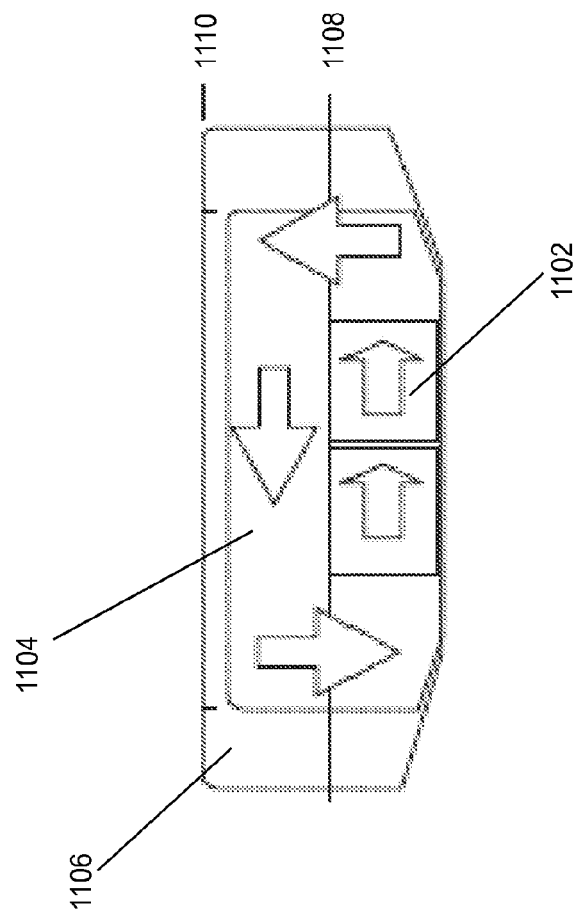
FIG. 11 is a diagram of an embodiment of the present invention for stabilizing the shield domain structure of a magnetic head.

In an embodiment of the invention as shown in FIG. 11, a manner for stabilizing the shield domain structure is shown that employs the magnetic field of a hard bias layer 1102. A suitable material for hard bias layer 1102 is a hard magnetic material such as CoPt, CoCrPt, or other similar material as known to those of ordinary skill in the art. In an embodiment, the hard bias material is formed by a sputtering process and patterned using a resist film. More particularly, it has been found that the shield domain structure is stabilized when the height 1108 of the hard bias layer 1102 in the depth direction is made substantially half the height of upper shield layer 1106 (height 1110). Shown also in FIG. 11 is lower shield layer 1104. A suitable shield material is NiFe but other suitable materials as known to those of ordinary skill in the art can also be use. In an embodiment, the shield material is formed by a plating process and patterned using a resist film. In an embodiment, it was found that a range which is closer to ½ the height of the shield performed better than ⅓ of the height of the shield, for example. The structure as shown in FIG. 11 can be achieved by various methods as known to those of ordinary skill in the art. For example, in an embodiment, successive deposition and etching steps are used to respectively add and remove material as desired to form the structure of FIG. 11.

Figure 12:
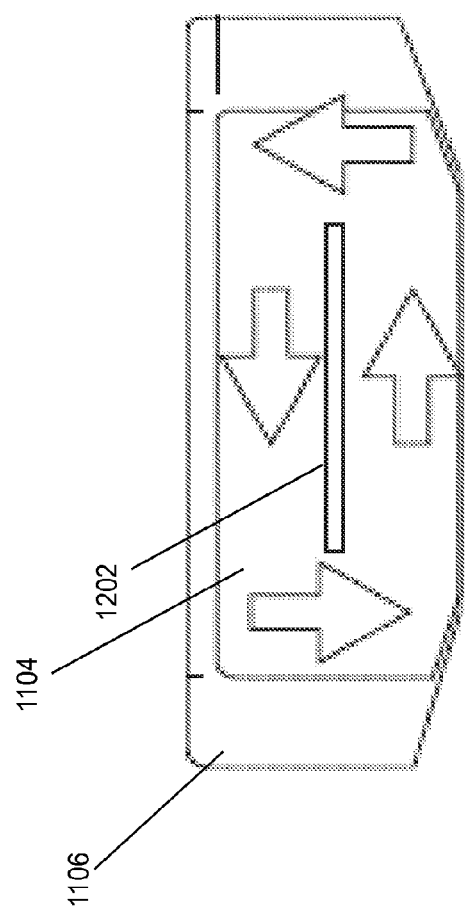
FIG. 12 is a diagram of an embodiment of the present invention for stabilizing the shield domain structure of a magnetic head.

In another embodiment of the invention as shown in FIG. 12, structure 1202 is provided at approximately the midpoint of the shield in order to fix the closure domain of the shield to the desired two-domain structure. In an embodiment of the invention structure 1202 is made convex as viewed from the air-bearing surface. In another embodiment, structure 1202 is made concave as viewed from the air-bearing surface. In yet another embodiment of the invention, structure 1202 is made substantially parallel to the air bearing surface. Structure 1202 serves to stabilize the shield and fix the closure domain of the shield to a two-domain structure.

In an embodiment, structure 1202 of FIG. 12 is achieved by forming a concave portion (recess portion) on the underside surface of the shield. In such an embodiment, convex nonmagnetic structure 1202 is formed as shown before the shield is formed. As a result, the shield having recess portion on under side surface is formed. In another embodiment, structure 1202 is achieved by forming a concave portion on the upper side of the shield. To form such a structure, after the shield is formed, a recess portion is formed on the upper side surface of the shield using milling process, for example. The described structures can be achieved by other methods as known to those of ordinary skill in the art.

In embodiments of the present invention (e.g., as shown in FIGS. 11 and 12) the shape of the shield is chosen to be substantially rectangular. One of ordinary skill in the art would, however, understand that variations are possible and that different shapes can be used.

It should be appreciated by those skilled in the art that the specific embodiments disclosed above may be readily utilized as a basis for modifying or designing other write elements. It should also be appreciated by those skilled in the art that such modifications do not depart from the scope of the invention as set forth in the appended claims.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method for manufacturing a magnetic head, comprising:
   - providing a first shield layer having a first height in a depth direction;
   - providing a hard bias layer over the first shield layer having a second height in a depth direction;
   - providing a second shield layer over the hard bias layer having a third height in a depth direction, wherein the second height is approximately in the range of ⅓ to ½ of the first height; and
   - fixing the first shield layer to a two-domain structure.

2. The method of claim 1, wherein the third height is approximately the same as the first height.

3. The method of claim 1, wherein the second height is approximately ⅓ to ½ of the third height.

4. The method of claim 1, wherein the first shield layer is substantially rectangular.

5. The method of claim 1, wherein the hard bias layer includes CoPt or CoCrPt.

6. The method of claim 5, wherein the first shield includes NiFE.

* * * * *